Aug. 14, 1962  S. KRSNA  3,049,658
TRANSISTORIZED VOLTAGE REGULATED POWER SUPPLY
Filed Nov. 28, 1960
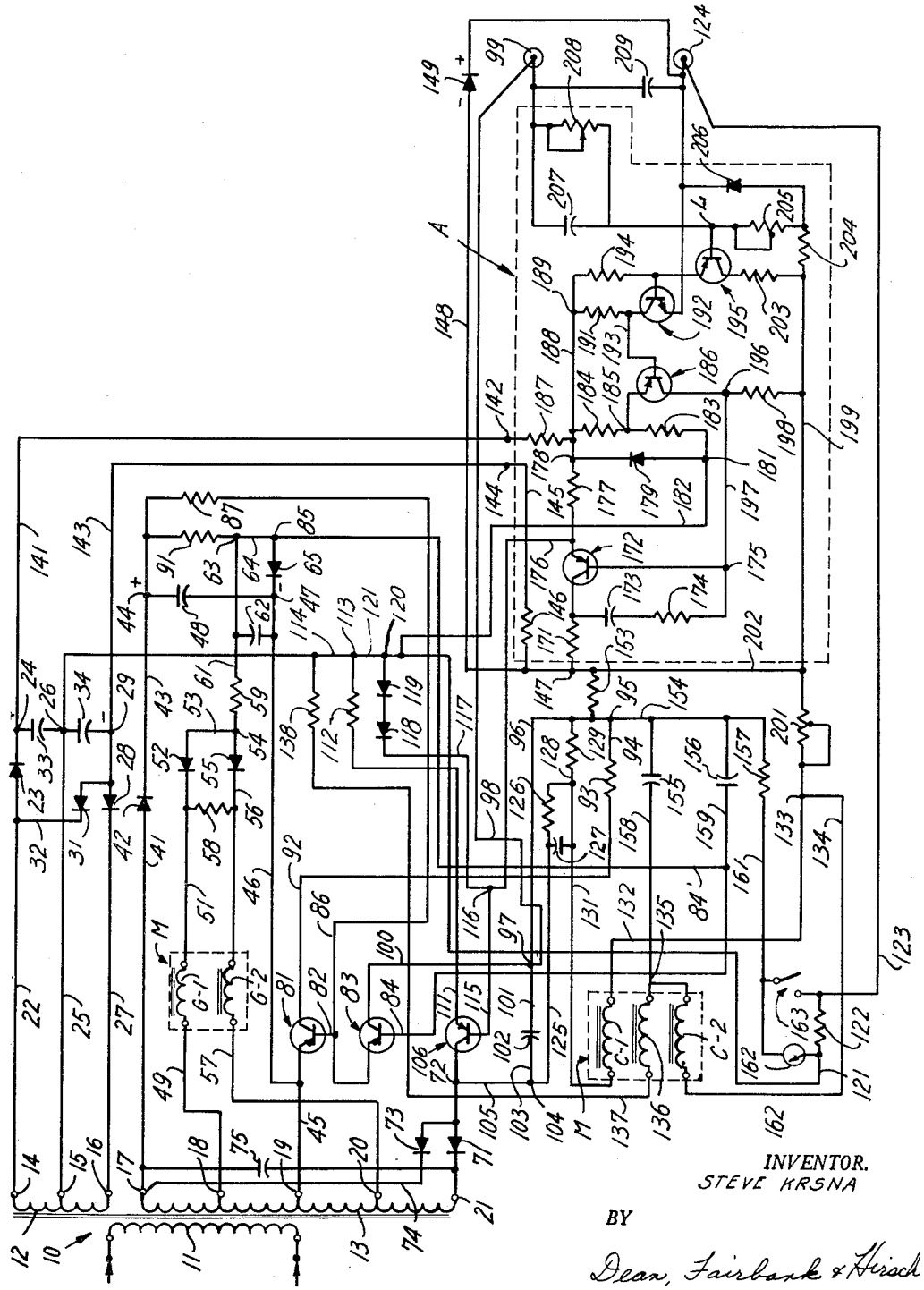
INVENTOR.
STEVE KRSNA
BY
Dean, Fairbank & Hirsch
ATTORNEYS

United States Patent Office 3,049,658
Patented Aug. 14, 1962

3,049,658
TRANSISTORIZED VOLTAGE REGULATED POWER SUPPLY
Steve Krsna, Rahway, N.J., assignor to NJE Corporation, Kenilworth, N.J., a corporation of New Jersey
Filed Nov. 28, 1960, Ser. No. 72,173
8 Claims. (Cl. 323—22)

This invention relates to the art of D.C. power supplies, more particularly of the transistorized type.

It is among the objects of the invention to provide a transistorized voltage regulated D.C. power supply that can handle relatively large amounts of power, yet can maintain a regulated voltage output with a minimum number of transistors.

According to the invention these objects are accomplished by the arrangement and combination of elements hereinafter described and more particularly recited in the claims.

In the accompanying drawing in which is shown one of various possible embodiments of the several features of the invention, the single FIGURE is a circuit diagram of the equipment.

Referring now to the drawing, the equipment comprises an input transformer 10 having a primary winding 11 to which a source of power, such as 115 volts A.C. may be connected. The transformer 10 has secondary windings 12 and 13, the former having three terminals 14, 15 and 16, and the latter five terminals 17, 18, 19, 20 and 21.

Terminal 14 is connected by lead 22 to the positive side of diode 23, the negative side of which is connected to junction 24. Terminal 15, which is the center tap of secondary winding 12, is connected by lead 25 to common junction 26. Terminal 16 is connected by lead 27 to the negative side of diode 28, the positive side of which is connected to junction 29 and to the positive side of diode 31, the negative side of the latter being connected by lead 32 to the positive side of diode 23.

Capacitors 33 and 34 are connected respectively between junctions 24, 26 and 26, 29.

Due to the rectifying action of diodes 23, 28 and 31, junction 29 will be negative with respect to junction 26, and junction 24 will be positive with respect to junction 26. Thus, a rectified and filtered potential will appear across capacitors 33 and 34.

The terminal 17 of secondary winding 13 is connected by lead 41 to the positive side of diode 42, the negative side of said diode being connected by lead 43 to junction 44. Center tap terminal 19 of secondary winding 13 is connected by leads 45 and 46 to junction 47, a capacitor 48 being connected across said junctions 44 and 47. Thus junction 44 will be positive with respect to junction 47.

The terminal 18 of winding 13 is connected by lead 49 to one end of the gate winding G-1 of a magnetic amplifier M which comprises, in addition to gate winding G-1, gate winding G-2 and control windings C-1 and C-2. The other end of gate winding G-1 is connected by lead 51 to the negative side of diode 52, the positive side of which is connected by lead 53 to junction 54 and to the positive side of diode 55. The negative side of diode 55 is connected by lead 56 to one end of gate winding G-2, the other end of said gate winding G-2 being connected by lead 57 to terminal 20 of secondary winding 13. Desirably, a resistor 58 is connected between the leads 51 and 56 to limit oscillation. The junction 54 is connected through resistor 59 by lead 61 to one side of capacitor 62 and to junction 63, said junction 63 being connected by lead 64 to the positive side of diode 65, the negative side of which is connected to junction 47, the other side of said capacitor 62 also being connected to said junction 47.

Terminal 21 is connected to the negative side of diode 71, the positive side of which is connected to junction 72 and to the positive side of diode 73, the negative side of said diode 73 being connected by lead 74 to terminal 17. Desirably, a capacitor 75 is connected between terminals 17 and 21.

Referring back to center tap winding 19, it is connected by lead 45 to the emitter of switching transistor 81, illustratively of the PNP type, the base of transistor 81 being connected by lead 82 to the emitter of driver transistor 83. The base of switching transistor 81 is also connected by lead 86 through resistor 87 to junction 44. The base of driver transistor 83 is connected by leads 84, 84' to junction 85 and then through resistor 91 to junction 44. The diode 42 serves to provide positive bias on the bases of transistors 81 and 83 to hold them non-conductive when the magnetic amplifier is non-conductive.

With the circuit thus far described, in the manner hereinafter set forth, negative pulses of controlled duration will be supplied from rectifier diodes 71, 73, which form a full wave rectifier, by the gate windings G-1, G-2 to the base of driver transistor 83 to effect the switching action of switching transistor 81.

The collector of switching transistor 81 is connected by lead 92 through resistor 93 and lead 94 to junction 95. Junction 95 is connected through lead 96 to junction 97, the latter being connected by lead 101 to one side of storage capacitor 102, the other side of said capacitor being connected by lead 103 to junction 104, and thence by lead 105 to junction 72, and to the collector of series regulating transistor 106. Thus a complete path is provided from terminal 19 through transistor 81 and capacitor 102 to the rectifier diodes 71, 73 and terminal 21. Junction 97 is also connected by lead 98 to positive output terminal 99 and by lead 100 to the collector of driver transistor 83.

The emitter of series regulating transistor 106 is connected by lead 111 to one side of resistor 112, the other side of said resistor being connected to junction 113, which in turn is connected by lead 114 to common terminal 26 and by lead 121 through meter shunt resistor 122 and lead 123 to negative output terminal 124.

The base of series regulating transistor 106 is connected by lead 115 to junction 116 and by lead 117 to the negative side of diode 118, the latter being connected in series with diode 119, the positive side of the latter being connected to junction 113, these diodes limiting the base drive on transistor 106.

Junction 104 is connected by lead 125 to one end of resistor 126 and capacitor 127. The other ends of resistor 126 and capacitor 127 are connected together and then connected by lead 128 to one side of resistor 129, the other side of which is connected to junction 95; and by lead 131 to one end of control winding C-1. Thus, there is a path from the collector of switching transistor 81 through lead 92 to junction 95 and through resistor 129 to one end of winding C-1. The other end of control winding C-1 is connected by lead 132 to junction 133 which is connected to resistor 201 which determines the bias of winding C-1. Junction 133 is also connected by lead 134 to one end of control winding C-2, the other end of said winding C-2 being connected to junction 135 and to one end of choke 136, the other end of the choke being connected by lead 137 through resistor 138 to junction 113. Thus, there is a path from control winding C-2 through the series regulating transistor 106.

Junction 24 is connected by lead 141 to junction 142 and junction 29 is connected by lead 143 to junction 144 to provide unregulated voltage for the regulator A of the equipment.

Junction 144, which is negative, is connected by lead 145 through resistor 146 to junction 147, and this junction is connected by lead 148 to the negative side of "Zener" diode 149, the positive side of said diode being connected to negative output terminal 124 which is connected to common terminal 26. Hence, the "Zener" diode 149 will provide a fixed voltage for the regulator A independent of current flow therethrough. Junction 147 is connected through resistor 153 to junction 95, said junction 95 also being connected by lead 154 to one side of capacitors 155 and 156 and to one end of resistor 157. The other side of capacitor 155 is connected by lead 158 to junction 135; the other side of capacitor 156 is connected by lead 159 to lead 84; and the other end of resistor 157 is connected by lead 161 to one side of meter 162, the other side of the meter being connected to lead 121. In addition, a switch 163 is connected across leads 161 and 123 so that the meter may function as a voltmeter when the switch is open as shown, and an ammeter when the switch is closed.

Junction 147 is connected through resistor 171 to the collector of transistor 172 of the regulator A and also to one side of capacitor 173, the latter being connected in series with resistor 174, the free end of which is connected to junction 175. The base of transistor 172 is connected to junction 175. The emitter of transistor 172 is connected by lead 176 to junction 116; and also through resistor 177 to junction 178. Junction 178 is connected to the positive side of "Zener" diode 179, the negative side of the diode being connected to junction 181. Junction 181 is connected by lead 182 to lead 121 at junction 120. In addition, junction 181 is connected to one end of series connected voltage divider resistors 183, 184, the junction 185 of said resistors being connected to the emitter of transistor 186. The free end of resistor 184 is connected to junction 178; through resistor 187 to junction 142 and by lead 188 to junction 189. Junction 189 is connected through resistor 191 to the collector of transistor 192 and also through lead 193 to the base of transistor 186. Junction 189 is also connected through resistor 194 to the base of transistor 192 and to the emitter of transistor 195. The collector of transistor 186 is connected to junction 196, which in turn is connected by lead 197 to junction 175 and through resistor 198 to lead 199. Lead 199 is also connected to one end of biasing potentiometer 201, and by lead 202 to junction 147. The collector of transistor 195 is connected through resistor 203 to lead 199 and through resistor 204 to one end of potentiometer 205 and to the negative side of "Zener" reference diode 206. The positive side of "Zener" reference diode 206 is connected to negative output terminal 124 and to the emitter of transistor 192. The other end of potentiometer 205 is connected at junction L to the base of transistor 195 and to one side of capacitor 207, the other side of the capacitor being connected to positive output terminal 99. A potentiometer 208 is connected across capacitor 207 and is in series with potentiometer 205 to define a voltage divider, and in addition a capacitor 209 is connected across output terminals 99 and 124.

*Operation*

When the equipment is turned on, unregulated filtered D.C. voltages will appear across capacitors 33 and 34. Due to the action of rectifier diodes 23, 31 and 28, junction 29 will be negative with respect to junction 26, and junction 24 would be positive with respect to junction 26, the junction 26 connected to the center tap 15 of secondary winding 12, thus being common.

Since the negative junction 29 is connected by leads 143, 145 through voltage dropping resistor 146, lead 148 to the negative side of "Zener" diode 149, the positive side of which is connected to common junction 26, there will illustratively be a fixed voltage of say −18 volts across the "Zener" diode 149.

Assuming that there is a change in the line voltage that should cause the negative voltage at junction 29 to change, the current through the resistor 146 would change as would the impedance of "Zener" diode 149 so that the voltage drop across the "Zener" diode would remain constant.

Hence, the "Zener" diode provides a fixed voltage of say −18 volts at junction 147 for the input of regulator unit A.

In addition, since the positive junction 24 is connected by leads 141 through voltage dropping resistor 187 to the positive side of "Zener" diode 179, the negative side of which is connected by leads 182 and 114 to common junction 26, there will illustratively be a constant +7 volts across the "Zener" diode 179.

With respect to "Zener" reference diode 206, the positive side of this diode is connected to negative output terminal 124 and by lead 123, meter resistance 122, leads 121, 114 to common junction 26. The negative side of "Zener" diode 206 is connected through voltage dropping resistor 204 and leads 199 and 202 to input junction 147 to which −18 volts is applied by "Zener" diode 149. As a result, a constant reference voltage of say −5.2 volts is provided across diode 206.

The series connected resistors 205 and 208 (the resistors 208 being variable to set the output voltage) form a voltage divider. One end of resistor 208 is connected to the positive output terminal 99 and one end of resistor 205 is connected to the negative side of "Zener" diode 206 which illustratively is −5.2 volts.

Assuming that instantaneously when the equipment is turned on there is no voltage across output terminals 99 and 124, then only −5.2 volts would appear at junction L which is applied to the base of transistor 195. Since the emitter of transistor 195 is connected through resistor 194 to +7 volts supplied by "Zener" diode 179, and the collector of transistor 195 is connected through resistor 203 to −18 volts supplied by "Zener" diode 149, the positive emitter will try to follow the base which is negative and the emitter will go to approximately −5.2 volts.

Since the base of transistor 192 is connected to the emitter of transistor 195, it will also go negative which will cut off transistor 192 so that its collector will go positive to +7 volts, the voltage being supplied from "Zener" diode 179.

As the base of transistor 186 is connected to the collector of transistor 192, the base of resistor 186 will also become positive so that such transistor will be cut off.

As a result, the collector of transistor 186 which is connected through resistor 198 to −18 volts will approach this value as will junction 196 and consequently the base of transistor 172 will also have approximately −18 volts applied thereto.

Since transistor 172 is connected as an emitter follower, its emitter will follow the base and will go to approximately −18 volts.

The emitter of transistor 172 is connected through leads 176 and 115 to the base of series regulating transistor 106 which will attempt to go to approximately −18 volts and hence the transistor 106 will conduct reducing its impedance and hence the voltage across transistor 106, causing the output voltage across terminals 99 and 124 to rise until the error signal developed by voltage divider 206, 208 is equal to the reference voltage of −5.2 volts at which time the output voltages will be the desired value determined by the setting of variable resistor 208.

Of course, in normal operation, there is a slight oscillation at the proper output voltage so that the transistor 106 will maintain the output voltage at a consistent value.

In addition, when the equipment is turned on, the alternating current induced in the secondary winding 13 of transformer 10 will alternately render terminals 18 and 20 positive and negative. Due to the diodes 52, 55 in series with the gate windings G–1 and G–2, current will only flow through the gate windings when the terminals 18 and 20 are negative. Hence, when the gate windings are in condition to permit passage of current therethrough, pulses corresponding to each half cycle of the input voltage will pass through the gate windings G–1, G–2 to be rectified (so that only negative pulses will pass) and shaped by diodes 52, 55, resistor 59 and capacitor 62 so that a shaped negative pulse will be applied to the base of switching transistor 83.

The circuit is from terminals 18 and 20, through leads 49 and 57, gate windings G–1, G–2, diodes 52, 55, resistor 59, leads 61, 64, 84′ 84 to the base of transistor 83.

Such negative pulses which may be in the order of —2 volts will be applied in synchronization with each half cycle of the A.C. input voltage, but they will not necessarily have a duration of each half cycle. This is due to the fact that the gate windings G–1, G–2 of the magnetic amplifier M are biased so that there will be no current flow therethrough until the control windings C–1, C–2 are energized in the manner hereafter described.

By controlling the current in the control windings C–1, C–2, the firing or conduction point of the gate windings can be shifted to occur at a desired point on the input cycle applied thereto, to determine the duration of the negative pulse applied to the base of transistor 83 which acts as the base drive of said transistor.

It is to be noted that control winding C–1 has one end connected through lead 132 and resistor 201 illustratively to —18 volts. As a result, current will flow through control winding C–1 causing gate winding G–1 and G–2 to conduct.

When gate windings G–1, G–2 are conducting, there is a relatively large current flow therethrough which will be far greater than the current flow through resistor 91 which maintains transistor 83 non-conductive when the gate windings G–1, G–2 are not conducting. Hence, such current through resistor 91 will have no effect.

However, when the gate windings G–1, G–2 are not conducting, if the current flow through resistor 91 should pass through diodes 52, 55 into the gate windings, it would cause them to conduct which is not desired. This is prevented by the action of diode 65.

Thus, when the gate windings G–1, G–2 are conducting in normal manner, they deliver a negative potential to the positive side of diode 65 which has no effect. However, when the voltage applied to the positive side of diode 65, due to the current flow through resistor 91 (which is in a positive direction) exceeds say .7 volt, diode 65 will conduct to bypass such positive voltage so that only .7 volt, illustratively, will be applied to the positive sides of diodes 52, 55. As it requires approximately .7 volt for these diodes to conduct, substantially no voltage will be applied to gate windings G–1, G–2.

When gate windings G–1 and G–2 conduct, negative, shaped pulses will be applied to the base of transistor 83.

The negative pulse applied to the base of transistor 83 is amplified thereby and such amplified signal is applied through lead 82 to the base of switching transistor 81 which is normally biased to cut off.

Hence, with each negative pulse applied to the base of drive transistor 83, the switching transistor 81 will be turned on to permit flow of current therethrough, the duration of such current flow being determined by the firing or conduction point of the gate windings G–1, G–2, which in turn determines the duration of the negative pulse to the base of transistor 83.

The circuit for such current flow is from terminal 19 of secondary winding 13, lead 45, emitter collector of transistor 81, lead 92, resistor 93, leads 94, 96, 101 to one side of capacitor 102 and from the other side of the capacitor, lead 105 to the positive sides of diodes 71, 73 to terminals 21 and 17 of secondary winding 13.

Thus when terminals 17 and 21 are negative with respect to center tap terminal 19, due to the action of diodes 71, 73 which form a full wave rectifier, current will flow through switching transistor 81 (when it is conducting) to charge the capacitor 102.

As a result, this capacitor 102 will provide a voltage across output terminals 99 and 124 through series regulating transistor 106 in series with the negative output terminal 124 and the capacitor 102 will reach its desired regulated value due to the action of the regulator A which controls series regulating transistor 106.

Assuming that there is a given load drawing, say 3 amperes across the output terminals 99 and 124 with a predetermined output voltage and the line voltage should increase, the increased voltage difference would normally have to appear across transistor 106.

With a given current, by the formula $W=EI$, the power dissipated across transistor 106 would be greatly increased by reason of such voltage rise and normally a number of transistors might be required to handle this increased power dissipation.

However, with the circuit herein described, the voltage drop across series regulating transistor 106 is maintained substantially constant independent of an increase in line voltage or reduction in output voltage which also tends to cause an increased voltage across transistor 106.

As a result of this, even with a constant current flow through the series regulating transistor 106, since the voltage drop is substantially constant, the heat dissipation is substantially constant and the series regulating transistor is selected so that it can handle such a given dissipation.

Thus, assuming that the output was set for 10 volts and the capacitor 102 charged to 30 volts, to maintain an output of 10 volts, 20 volts would have to be taken care of by the system. This voltage would normally have to appear across regulating transistor 106. However, as soon as there was an increase in the voltage across transistor 106, since control winding C–2 is in series with transistor 106, such increase in voltage would cause an increase in the current in control winding C–2. Since the current in control winding C–2 is opposed to that in control winding C–1, this will cause the gate windings G–1 and G–2 to fire later in each half cycle.

As a result, the duration of each negative impulse to driver transistor 83 would be reduced so that the switching transistor 81 would turn on and off at longer intervals.

Consequently, smaller portions of each half cycle would be applied to the capacitor 102 so that the average value of the charge thereon would be reduced.

This would mean that the output voltage from capacitor 102 applied to the output terminals 99, 124 would be less.

The resistor 201 which sets the bias on control winding C–1 is preset so that based upon the maximum desired output voltage across terminals 99, 124, the maximum period of conduction of the gate windings G–1, G–2 will only permit capacitor 102 to charge to a value such that the difference between the voltage across the capacitor and the output voltaage will be a predetermined value. This value multiplied by the maximum current capacity of the equipment will provide a power dissipation within the capabilities of the transistor 106.

With the equipment above described, it is apparent that if the magnetic amplifier is not conducting, the switching transistor 81 is not conducting and hence no power is dissipated in this transistor. When the magnetic amplifier is conducting, switching transistor 81 is also fully conducting so although the current flow therethrough is large, the voltage drop is low. This will result in low power dissipation.

With respect to the series regulating transistor 106, since its voltage is maintained substantially constant at a desired value, the maximum power dissipation can be held within desired limits.

Thus the equipment has means for maintaining a constant output voltage through the action of regulator A and can handle relatively large amounts of power with a minimum number of transistors.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A transistorized D.C. power supply having an output across which a load may be connected, comprising a voltage regulator adapted to provide an error signal related to variations in the output voltage from a desired output voltage, a series regulating transistor controlled by said error signal to maintain the output voltage at such desired value by varying the voltage drop across said series regulating transistor, a capacitor in series with said series regulating transistor, defining a source of voltage for said output, means to apply unregulated pulsating D.C. to charge said capacitor and means controlled by variations iin the voltage across said series regulating transistor to vary the average value of the charge on said capacitor from said unregulated D.C. source in inverse relation to variations in the voltage across said series regulating transistor.

2. The combination set forth in claim 1 in which the means controlled by variations in the voltage across said series regulating transistor comprises normally open switch means connected in series with said capacitor and said D.C. source, the magnitude of the voltage variation across said series regulating transistor determining the period of closure of said switch means.

3. The combination set forth in claim 1 in which the means controlled by variations in the voltage across said series regulating transistor comprises a normally non-conducting switching transistor connected in series with said capacitor and said D.C. source, and means controlled by variations in the magnitude of the voltage variations across said series regulating transistor to effect conduction of said switching transistor for portions of each of the cycles of the pulsating D.C.

4. The combination set forth in claim 1 in which a normally non-conducting switching transistor is connected in series with said capacitor and said pulsating D.C. source, a magnetic amplifier having a gate winding controlling the conduction of said switching transistor, said magnetic amplifier having a first control winding, means to energize said first control winding to effect conduction of said gate winding to effect corresponding conduction of said switching transistor for a portion of each of the cycles of the pulsating D.C., the means controlled by the variations in the voltage across said series regulating transistor opposing the energization of said control winding, to effect conduction of said gate winding for a period of each cycle of the pulsating D.C. in inverse relation to such voltage variations across said series regulating thereby varying the average value of the charge on said capacitor.

5. The combination set forth in claim 4 in which a driver transistor controls the conduction of said switching transistor, and said driver transistor is controlled by the conduction of said gate winding.

6. The combination set forth in claim 4 in which said magnetic amplifier has two gate windings, means to apply alternating current to each of said gate windings, means to rectify and shape said alternating current to provide pulses, a driver transistor controlling the conduction of said switching transistor and means to apply said pulses to said driver transistor to effect conduction of said switching transistor during each of the periods of said D.C. impulses.

7. The combination set forth in claim 4 in which said magnetic amplifier has two gate windings, said first control winding and a second control winding, means to apply alternating current to each of said gate windings, means to rectify and shape said alternating current to provide pulses, a driver transistor controlling the conduction of said switching transistor, means to apply said pulses to said driver transistor to effect conduction of said switching transistor during each of the periods of said D.C. impulses, said second control winding being controlled by variations in the voltage across said series regulating transistor to change the time of conduction of said gate windings, thereby to vary the duration of said D.C. impulses to vary the duration of conduction of said switching transistor to vary the average value of the charge on said capacitor.

8. The combination set forth in claim 4 in which a "Zener" diode provides a fixed source of potential and means are provided to vary the value of the current flow through said gate windings from said fixed source of potential.

No references cited.